United States Patent
Nishida et al.

(10) Patent No.: US 7,685,989 B2
(45) Date of Patent: Mar. 30, 2010

(54) TWO-CYCLE ENGINE

(75) Inventors: Kenji Nishida, Saitama (JP); Hisashi Sakuyama, Saitama (JP); Takahiro Kimijima, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 170 days.

(21) Appl. No.: 12/065,866

(22) PCT Filed: Sep. 7, 2006

(86) PCT No.: PCT/JP2006/317765

§ 371 (c)(1),
(2), (4) Date: Mar. 5, 2008

(87) PCT Pub. No.: WO2007/029782

PCT Pub. Date: Mar. 15, 2007

(65) Prior Publication Data

US 2009/0138174 A1    May 28, 2009

(30) Foreign Application Priority Data

Jun. 16, 2005  (JP) .............................. 2006-167360
Sep. 9, 2005   (JP) .............................. 2005-261769

(51) Int. Cl.
*F02F 1/22*   (2006.01)
*F02B 17/00*  (2006.01)

(52) U.S. Cl. .................. 123/295; 123/65 PE; 123/73 C
(58) Field of Classification Search ............. 123/65 PE, 123/73 C, 295
See application file for complete search history.

(56) References Cited

U.S. PATENT DOCUMENTS 4,016,839 A    4/1977  Morton
4,399,778 A    8/1983  Ancheta
4,920,932 A *  5/1990  Schlunke ................. 123/65 PE
5,190,006 A *  3/1993  Motoyama et al. .......... 123/305
5,495,836 A *  3/1996  Wakabayashi et al. . 123/339.13
5,697,332 A * 12/1997  Asai et al. ............... 123/65 PE (Continued)

FOREIGN PATENT DOCUMENTS

JP           54-148926 A        11/1979

(Continued)

*Primary Examiner*—Erick Solis
(74) *Attorney, Agent, or Firm*—Birch, Stewart, Kolasch & Birch, LLP

(57) ABSTRACT

A 2-cycle engine 1 is provided with an ignition device 8; an exhaust control valve 24; and a controller 40 for controlling the ignition device 8 and the exhaust control valve 24. The controller 40 controls spark ignition combustion by activating the ignition device 8 in a high load range, and controls self-ignition combustion of a mixture in the combustion chamber 10 by adjusting pressure in a cylinder chamber 3a with adjustment of the opening of the exhaust port 21 in a low load range. In a low load and low rotational speed range, moreover, there is formed a stratified mixture field, in which the air and the fuel are much distributed in the central portion 10c of the combustion chamber 10 and in which burned gas remaining in the combustion chamber 10 is much distributed in the outer side 10b of the central portion of the combustion chamber 10, so that the self-ignition combustion of the mixture may be performed by forming the stratified mixture field in the low load and low rotational speed range.

16 Claims, 8 Drawing Sheets

U.S. PATENT DOCUMENTS

| | | | |
|---|---|---|---|
| 6,007,392 A | * 12/1999 | Motose | 440/89 R |
| 6,021,748 A | * 2/2000 | Motose | 123/65 PE |
| 6,116,228 A | 9/2000 | Motose et al. | |
| 6,474,275 B1 | 11/2002 | Drecq | |
| 6,481,394 B1 | * 11/2002 | Hiki | 123/65 PE |
| 7,000,594 B2 | * 2/2006 | Arakawa et al. | 123/406.13 |

FOREIGN PATENT DOCUMENTS

| | | |
|---|---|---|
| JP | 62-189953 A | 8/1987 |
| JP | 5-171981 A | 7/1993 |
| JP | 7-71279 A | 3/1995 |
| JP | 7-150981 A | 6/1995 |
| JP | 7-158447 A | 6/1995 |
| JP | 11-182295 A | 7/1999 |
| JP | 2001-214741 A | 8/2001 |
| JP | 2002-147237 A | 5/2002 |
| JP | 2003-286880 A | 10/2003 |
| JP | 2004-28022 A | 1/2004 |
| JP | 2004-144052 A | 5/2004 |
| TW | 187174 | 7/1992 |
| TW | 394819 B | 6/2000 |
| TW | 403811 B | 9/2000 |
| WO | WO-92/12332 A1 | 7/1992 |

* cited by examiner

TWO-CYCLE ENGINE

BACKGROUND OF THE INVENTION

1. Field of the Invention

The present invention relates to a 2-cycle engine, which includes an exhaust control valve capable of adjusting the opening of an exhaust port so as to perform self-ignition combustion of supply air and supply fuel in a combustion chamber with operation of the exhaust control valve.

2. Related Art

In the 2-cycle engine, a scavenging efficiency drops as the intake quantity becomes small, so that a sufficient exhaust is not performed from the exhaust port to leave the burned gas in a large quantity in a cylinder chamber (although such gas will also be called the "residual gas"). Generally speaking, if the air and the fuel are supplied into the combustion chamber having the burned gas left therein, three components including the air, the fuel and the residual gas are mixed substantially homogeneously in the combustion chamber. The residual gas is heated to a high temperature by the combustion so that it holds a high thermal energy, but has an effect to suppress the combustion because it is an inert gas.

In case the engine is in a low load range, when spark ignition combustion is performed utilizing an ignition plug in a condition where air and fuel supplied into the combustion chamber and burned gas remaining in the combustion chamber at a preceding step are mixed, flame propagation at the time of ignition or after ignition is blocked by the residual gas having the abovementioned effect to cause an irregular combustion. If this irregular combustion occurs, the fuel to be supplied is not completely burned, and the unburned gas containing a harmful substance is discharged to an outside thereby to raise problems in fuel consumption and environments.

On the other hand, there is known (as referred to JP-A-07-071279, for example) an engine provided with an exhaust valve capable of controlling the opening of the exhaust port. This engine is configured in such a manner that: the operation of the exhaust valve is controlled in accordance with a load to adjust the opening of the exhaust port; the ratio of the mass of the residual gas to that of the whole gas in the cylinder at the time of starting a compression stroke (although the ratio will be called the "EGR ratio") is adjusted; the mixture in the combustion chamber is heated utilizing the thermal energy of the residual gas; and self-ignition combustion of the mixture is performed.

The engine of this structure is configured in such manner that the operations of the exhaust valve and the ignition plug are controlled so that the spark ignition combustion is performed in a high load range and the self-ignition combustion is performed in the low load range. In the self-ignition combustion, since a combustion mode is bulk combustion, the irregular combustion is eliminated entirely in the combustion chamber thereby to improve the fuel consumption and to reduce the quantity of the harmful exhaust gas.

As shown in FIG. 8, the residual gas retains the thermal energy so that the gas temperature in the cylinder chamber at the end of the compression stroke rises as the EGR ratio rises. It has also been confirmed that the self-ignition combustion can be performed if the gas temperature exceeds a predetermined temperature $T_{AR}$. As shown in FIG. 9, on the other hand, at the end of the combustion stroke, the gas temperature in the cylinder chamber is lowered by the combustion suppression effect of the residual gas itself, as the EGR ratio raises. Even if the actuation of the exhaust valve is controlled to keep the gas temperature at a high value at the end of the compression stroke so that the EGR ratio may rise, the thermal energy for heating the air and the fuel sufficiently at the next compression stroke becomes so short that the temperature $T_{AR}$ necessary for the self-ignition combustion cannot be kept, because the gas temperature at the end of the combustion stroke seriously drops when the EGR ratio exceeds a predetermined $EGR_{AR}$.

This phenomenon takes place in case, particularly in a high output type engine, the feed of air becomes short in a low load and low rotational speed range so that it becomes difficult to control the scavenging flow. In this area where such self-ignition combustion cannot be performed, the irregular combustion still occurs. The elimination of the irregular combustion in the low load range is a problem.

SUMMARY OF THE INVENTION

One or more embodiments of the present invention provide a 2-cycle engine, which can eliminate irregular combustion in a low load range thereby to improve the fuel consumption.

In accordance with one or more embodiments of the present invention, a 2-cycle engine is provided with: a cylinder having a cylinder chamber, the cylinder chamber housing a piston therein; an ignition device including an ignition portion directed into a combustion chamber; an exhaust control valve for adjusting the opening of an exhaust passage connected to an exhaust port opened on an inner circumference of the cylinder chamber; and a controller for controlling actuations of the ignition device and the exhaust control valve, wherein the controller execute such control that: the ignition device is activated in a high load range to perform, in the combustion chamber, spark ignition combustion of a mixture including air and fuel supplied into the cylinder chamber; and pressure in the cylinder chamber is adjusted by adjustment of an opening of the exhaust port in a low load range to perform self-ignition combustion of the mixture in the combustion chamber. The 2-cycle engine has stratified mixture field forming means for forming a stratified mixture field where: the mixture is much distributed at a central portion of the combustion chamber; and burned gas remaining in the combustion chamber is much distributed on an outer side of the central portion of the combustion chamber, in a low load and low rotational speed range that is a low rotational speed range within the low load range, and the controller executes such control that the stratified mixture field forming means forms the stratified mixture field to perform self-ignition combustion of the mixture, in the low load and low rotational speed range.

Moreover, the controller may execute such control that in an extremely low load and low rotational speed range, which is a low load as well as low rotational speed range within the low load and low rotational speed range, the ignition device is activated to perform spark ignition combustion of the mixture forming the stratified mixture field.

Moreover, the stratified mixture field forming means may include the exhaust control valve, and the controller is preferably configured to execute such controls that: in the low load and low rotational speed range, the exhaust control valve is activated so that the opening of the exhaust port becomes smaller; in a low load and medium rotational speed range, which is a medium rotational speed range within the low load range, the exhaust control valve is activated so that the opening of the exhaust port becomes larger than that of the case in the low load and the low rotational speed range and the opening of the exhaust port rises as the load rises; and in a high load range, the exhaust control valve is activated so that the opening of the exhaust port becomes larger than that of the case in the low load and medium rotational speed range and the opening of the exhaust port rises as the load rises.

Moreover, the stratified mixture field forming means preferably have the combustion chamber whose top part is offset to the exhaust port or to an opposite side thereof with respect to a cylinder axis of the cylinder chamber. Moreover, the stratified mixture field forming means preferably includes a direct injection device, the actuation of which is controlled by the controller to inject and supply the supply fuel directly into the cylinder chamber, and the controller is preferably configured to execute, in the low load and low rotational speed range, such control that the direct injection device is activated so that a timing for supplying the supply fuel into the cylinder chamber is delayed compared with the case in the low load and medium rotational speed range and the high load range. Moreover, the stratified mixture field forming means preferably include a sub-throttle valve for enabling adjustment of a quantity of the air supplied into the combustion chamber in accordance with an opening, and the controller is preferably configured to execute, in the low load and low rotational speed range, such control that the sub-throttle valve is activated so as to get larger the opening of the sub-throttle valve as reduction of the load to increase the quantity of the supply air.

Moreover, the 2-cycle engine is preferred to further comprises a load detecting device for detecting a load, and a temperature detecting device for detecting an engine temperature, and the controller is preferably configured to execute such control that a timing when the fuel is supplied into the combustion engine, the quantity of the supply fuel, and the opening of the exhaust port are adjusted on the basis of the load detected by the load detecting device and the engine temperature detected by the temperature detecting device.

According to the 2-cycle engine of one or more embodiments of the present invention, the stratified mixture field where the mixture is much distributed at the central portion of the combustion chamber and the burned gas is much distributed on the outer side thereof, is formed by the stratified mixture field forming means in the low load and low rotational speed range. If the combustion chamber is viewed in its entirety, that is, if those three components are homogeneously mixed, the state in which the EGR ratio is low at a central portion and the self-ignition combustion can be performed, is established even if the EGR ratio is high that can not be performed the self-ignition combustion. According to this constitution, therefore, the self-ignition combustion can be executed even in the area where the self-ignition combustion has been impossible in the conventional art with the three components being substantially homogeneously mixed, so that the area for the self-ignition combustion can be enlarged to improve the fuel consumption or to reduce the noxious exhaust gases.

Moreover, when a control is executed such that in the extremely low load and low rotational speed range, the ignition device is activated to perform spark ignition combustion of the mixture forming the stratified mixture field, irregular combustion in the low load range, such as at the time of low temperature, can be eliminated more reliably to achieve a further improvement in fuel consumption or reduction in the quantity of harmful exhaust gas.

Moreover, the exhaust control valve is disposed as the stratified mixture field forming means, and the controller controls operation of the exhaust control valve in the low load and low rotational speed range so that the opening of the exhaust port may become smaller than that of case in the other load range. As a result, the exhaust pressure is adjusted to a higher level, and the air supplied into the cylinder chamber does not flow toward the exhaust port but is introduced into the combustion chamber while forming vertically spiral flow. Thus, the stratifying of the air and the residual gas can be promoted to perform the self-ignition combustion in the low load and low rotational speed range.

As the stratified mixture field forming means, the top part of the combustion chamber is offset to the exhaust port or to the opposite side thereof with respect to the cylinder axis of the cylinder chamber. As a result, a deviation of large pressure field is formed between a side provided with the exhaust port and an opposite side thereof across the cylinder axis of the cylinder chamber so that the formation of the vertically spiral flow is promoted. Therefore, it is possible to reliably form the stratified mixture field.

Moreover, a direct injection device for injecting the fuel directly into the cylinder chamber is disposed as the stratified mixture field forming means, and the controller control the operation of the direct injection device in the low load and low rotational speed range so that the fuel injection timing may be delayed compared with the case in the other load range. As a result, since a time when the fuel is circulated around the entirety of the cylinder chamber and the combustion chamber is not sufficiently ensured, it is possible to more reliably form the stratified mixture field.

Moreover, a sub-throttle valve capable of adjusting the quantity supplying air into the cylinder chamber by adjustment of the opening is disposed as the stratified mixture field forming means, and the controller control the operation of the sub-throttle valve in the low load low rotational speed range so that the opening of the sub-throttle valve may be larger as the load drops. As a result, even when the load drops so that the quantity of air supplied into the cylinder chamber is short, air can be supplied by covering its shortage. The quantity of air supplied into the cylinder chamber can be stabilized to stably control the air flow for forming the stratified mixture field regardless of increase/decrease of the load.

Other aspects and advantages of the invention will be apparent from the following description and the appended claims.

DESCRIPTION OF REFERENCE NUMERALS

Figure 1:
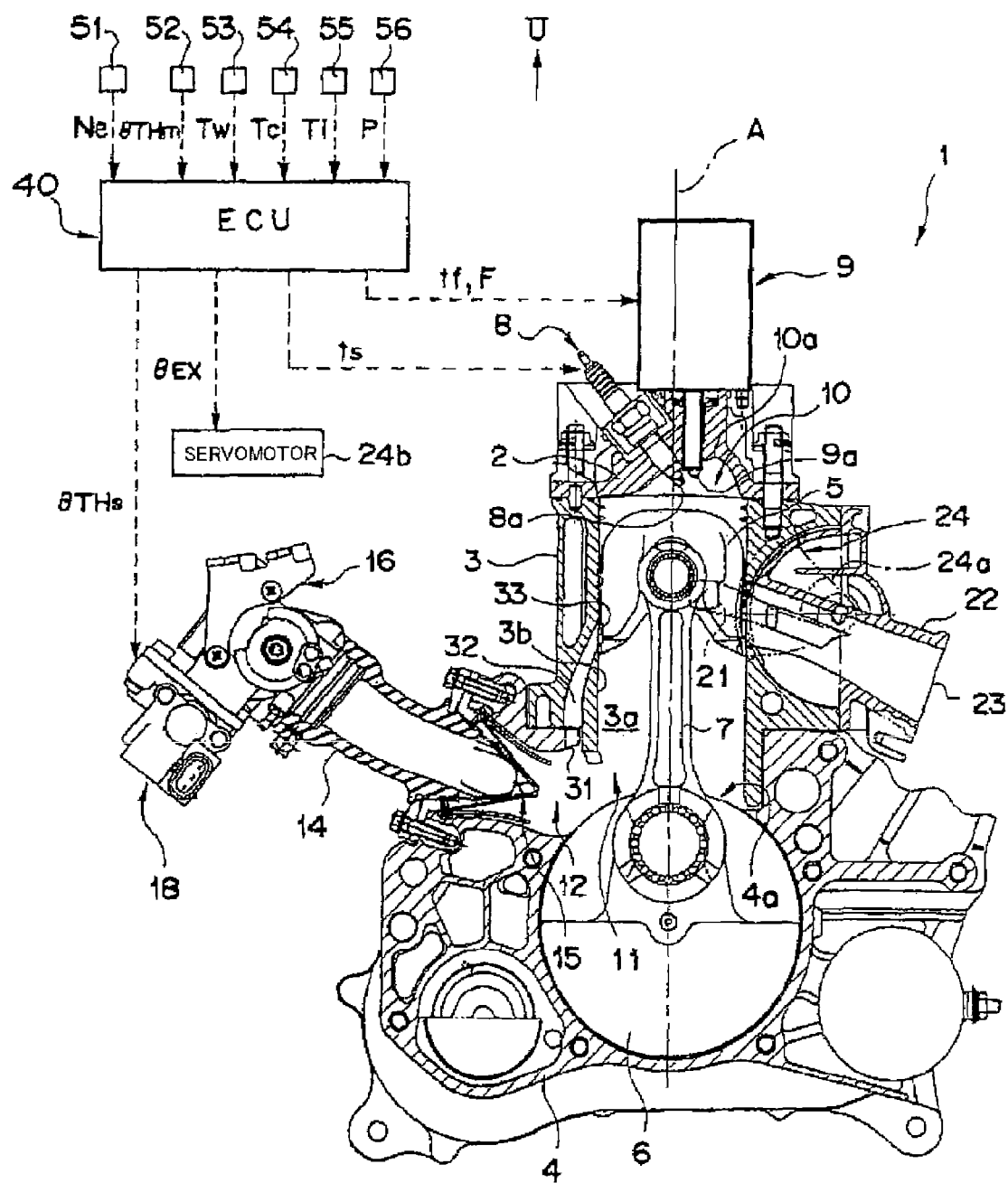
FIG. 1 is a section of an engine in exemplary embodiments of a 2-cycle engine according to the invention.

1 ... Engine
3 ... Cylinder block
4 ... Crankcase
8 ... Ignition plug
9 ... Combustion injection valve
10 ... Combustion chamber
18 ... Sub-throttle valve
21 ... Exhaust port
24 ... Exhaust control valve
33 ... Scavenge outlet
40 ... ECU

DETAILED DESCRIPTION OF THE EXEMPLARY EMBODIMENTS

Exemplary embodiments of the invention will be described with reference to the accompanying drawings. FIG. 1 shows a 2-cycle engine according to an exemplary embodiment of the invention. The engine 1 is configured by jointing a cylinder head 2, a cylinder block 3 and a crankcase 4 vertically.

In the cylinder block 3, there is formed a cylinder chamber 3a, in which a piston 5 is vertically slidably arranged. The crankcase 4 is jointed to the cylinder block 3, and a crank chamber 4a in which a crankshaft 6 is housed is communicated with the cylinder chamber 3a. The piston 5 and the crankshaft 6 are connected through a connecting rod 7. Moreover, the inner circumference 3b of the cylinder chamber 3a, the upper face of the piston 5 and the inner wall of the cylinder head 2 define a combustion chamber 10. The cylinder head 2 is provided with an ignition plug 8 and a fuel injection valve 9, and an ignition portion 8a of the ignition plug 8 and the nozzle portion 9a of the fuel injection valve 9 are directed into the combustion chamber 10 from the inner wall of the cylinder head 2.

Figure 4:
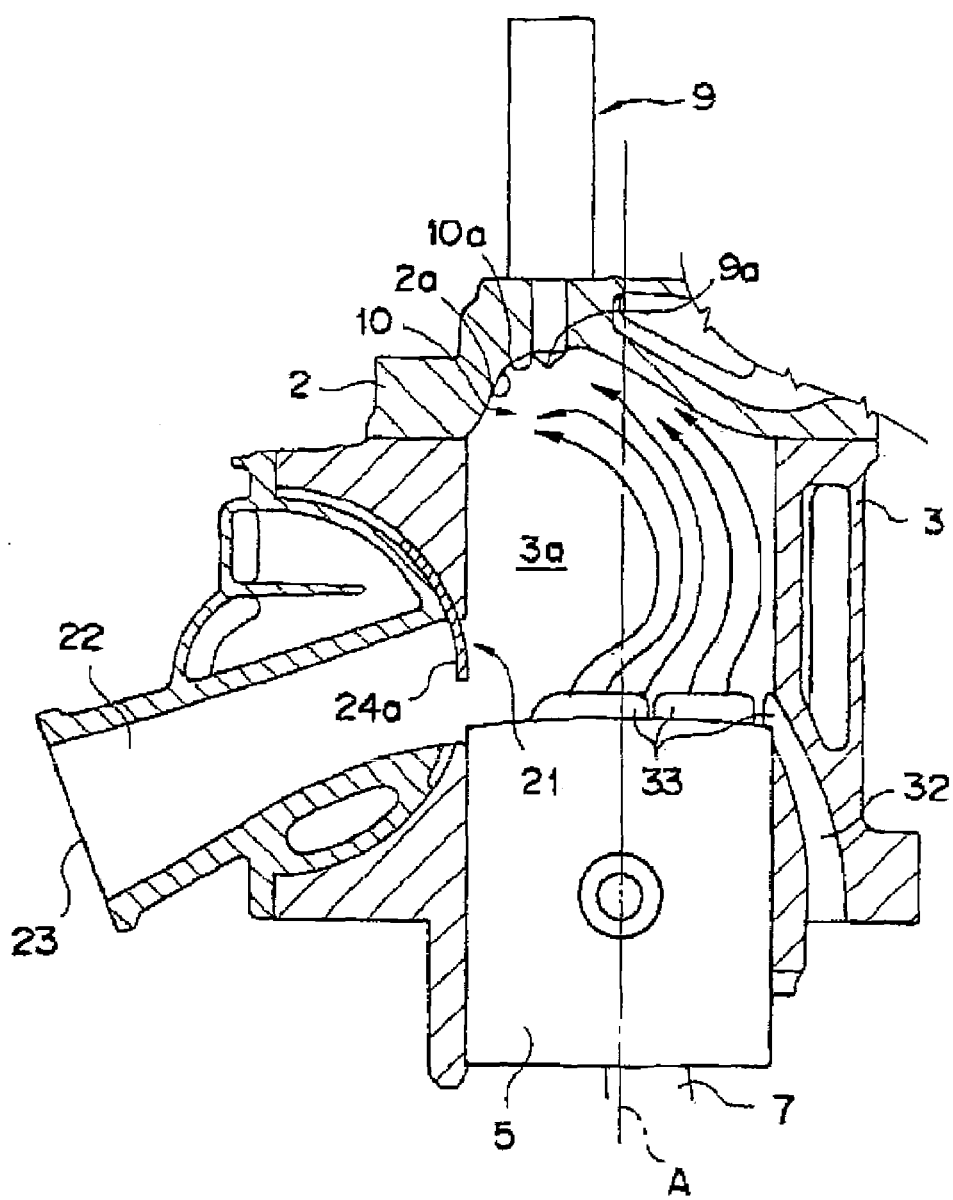
FIG. 4 is a section of the engine showing flow of air from a scavenge outlet in a low load and low rotational speed range.
Figure 5:
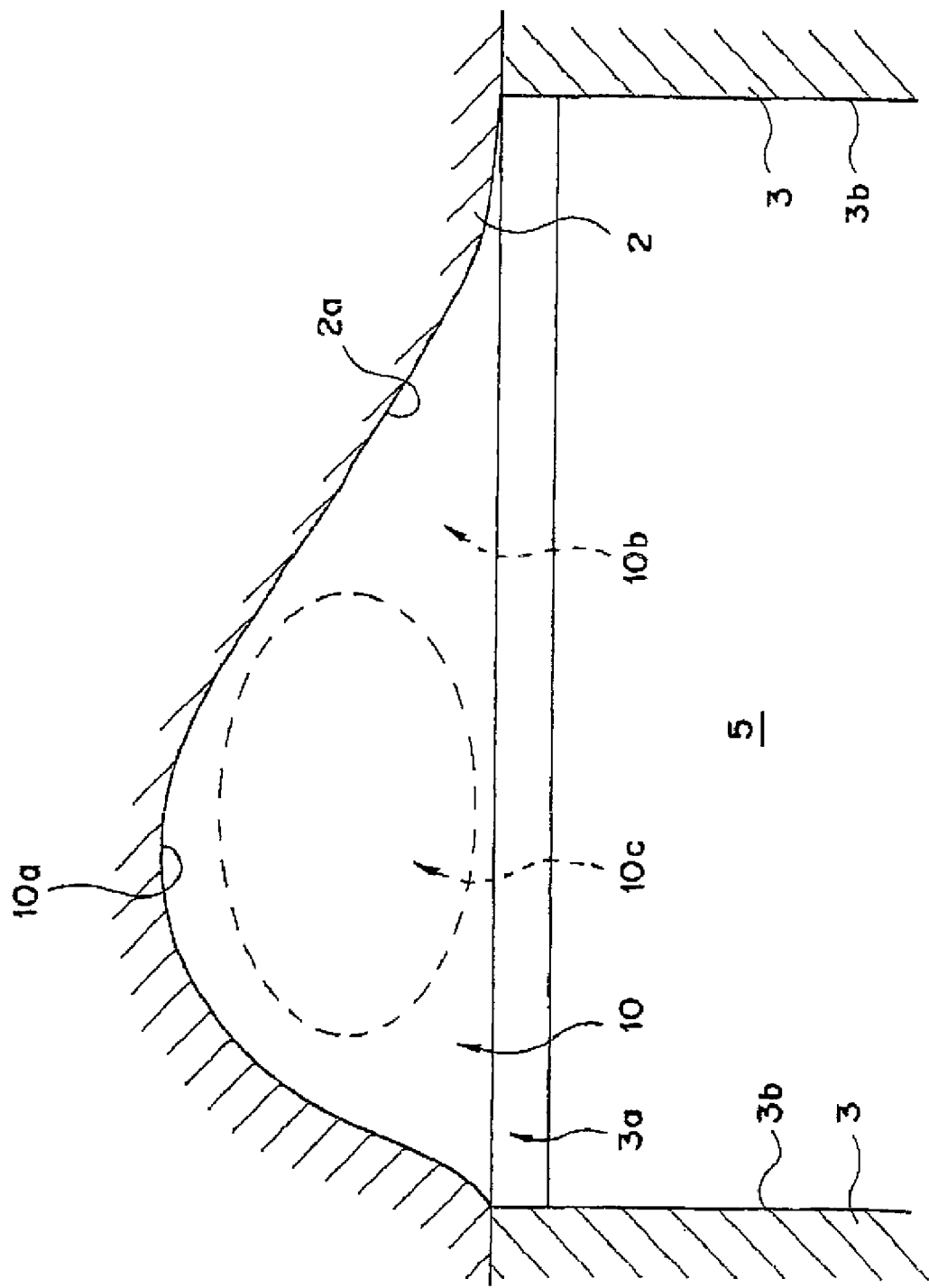
FIG. 5 is a schematic diagram of a stratified mixture field.

As shown in FIG. 4, the combustion chamber 10 is formed into a substantially semispherical shape having a top portion 10a, by a concave portion 2a formed on the inner wall of the cylinder head 2. The top portion 10a is offset with respect to a cylinder axis A, as indicated by single-dotted line, to the later-described exhaust port. The ignition plug 8 is disposed such that its ignition portion 8a is protruded in a predetermined extent into the combustion chamber 10. The fuel injection valve 9 is disposed such that its nozzle portion 9a is protruded downward in a predetermined extent from the top portion 10a of the combustion chamber, and fuel is directly injected from the nozzle portion 9a into the cylinder chamber 3a.

In the crankcase 4, there is formed an intake passage 12, which is connected at its one end to an intake port 11 communicated with the crank chamber 4a and which communicates at its other end with the outside. An intake manifold 14 is connected with the intake passage 12. The intake passage 12 is provided with a reed valve 15 made of an elastically deformable reed member. An intake throttle valve 16 having a variable opening θTHm is attached to the intake manifold 14. To this intake manifold 14, there is connected the not-shown intake sub-passage in communication with the downstream side of the intake throttle valve 16. A sub-throttle valve 18 having a variable opening θTHs is attached to this intake sub-passage. Here, the not-shown air cleaner is connected to the upstream of the intake throttle valve 16 and the sub-throttle valve 18, and clean air is supplied from the air cleaner to the intake manifold 14.

In the reed valve 15, the reed member is cantilever supported so as to close the intake passage 12 at all times. When the crank chamber 4a is evacuated in a negative pressure, the reed member warps to open the intake passage 12. The opening θTHm is varied according to the manual operation of the not-shown throttle grip by the intake throttle valve 16, and the quantity of air supplied to the crank chamber 4a is changed according to this opening θTHm of the intake throttle valve 16. When the opening θTHs is adjusted by operating the sub-throttle valve 18, the air supplied to the crank chamber 4a can be replenished to adjust the quantity of air supplied to the crank chamber 4a regardless of the opening θTHm of the intake throttle valve 16.

And, the cylinder block 3 is provided with an exhaust passage 22, which is connected at its one end to an exhaust port 21 communicated with the cylinder chamber 3a and at its other end to an exhaust connection port 23 communicated with the outside. The exhaust passage 22 is provided with an exhaust control valve 24. This exhaust control valve 24 is configured to have a slidable valve member 24a, which is formed in a sector shape, as seen in a side view. This valve member 24a is slid by a servomotor 24b as a drive source, the exhaust port 21 is closed downwardly from upward by the sliding motions. By controlling the drive of the servomotor 24b to adjust the sliding position of the valve member 24a, the opening θEX of the exhaust port 21 can be continuously adjusted between the fully open state, in which the valve member 24a is slid upward to a retracted position, and the fully closed state, in which the valve member 24a is slid to the lower limit position.

In the cylinder chamber 3a, moreover, a scavenge outlet 33 is opened at a position lower than the exhaust port 21, and a scavenge inlet 31 is opened in the crank chamber 4a. When the cylinder block 3 and the crankcase 4 are jointed, there is formed a scavenge passage 32, which communicates at its one end with the scavenge inlet 31 and at its other end with the scavenge outlet 33.

In the engine 1 that is constructed as described above, when the piston 5 moves upward from the bottom dead point, the crank chamber 4a is evacuated in a negative pressure, and the reed valve 15 is opened to supply the air having a quantity according to the opening θTHm of the intake throttle valve 16 to the crank chamber 4a, while the gas in the cylinder chamber 3a is compressed (at the intake/compression stroke). At this time, the fuel is injected in a predetermined quantity at predetermined injection timing from the fuel injection valve 9 into the cylinder chamber 3a. When the piston 5 moves upward up to near the top dead point, a mixture of the compressed air and fuel is burned (at the combustion stroke). As a result, the piston 5 moves downward from the top dead point.

When the piston 5 moves downward, the exhaust port 21 which has been closed by the side face of the piston 5 is opened to the cylinder chamber 3a, and then the burned gas is exhausted from the exhaust port 21 to the exhaust passage 22 (at the exhaust stroke). When the piston 5 moves downward, the scavenge outlet 33 positioned below the exhaust port 21 is opened to the cylinder chamber 3a, and the air compressed in the crank chamber 4a flows from the scavenge inlet 31 into the scavenge passage 32 by the downward movement of the piston 5. The air which flows into the scavenge passage 32 is supplied from the scavenge outlet 33 into the cylinder chamber 3a so that the exhaust of the burned gas is promoted (at the exhaust/scavenge stroke). When the piston 5 again moves upward from the bottom dead point, the scavenge outlet 33 and the exhaust port 21 are sequentially closed by the side face of the piston 5, and then the intake and compression strokes are performed.

At the start of the combustion stroke of the engine 1 (at the end of the compression stroke), in the combustion chamber 10, there exist the three compositions: the air supplied from the scavenge outlet 33; the fuel injected from the fuel injection valve 9; and the burned gas remaining in the cylinder chamber 3a without being exhausted from the exhaust port 21 at the preceding exhaust and scavenge strokes. This burned gas holds a high temperature and high thermal energy but retains a combustion suppressing effect as inert gas. As a result, even if the spark ignition combustion utilizing the ignition plug 8 is performed in such a state that the quantity of air supplied from the scavenge outlet 33 is so low and the EGR ratio rises, the flame propagation from the ignition portion 8a is obstructed by the combustion suppressing effect of the burned gas thereby to cause irregular combustion. In order to avoid that irregular combustion, as will be described later, a controller (as will be called the "ECU") 40 performs such control that the opening θEX of the exhaust port 21 is adjusted thereby to adjust the EGR ratio, and self-ignition combustion of the air and the fuel may be performed at an optimum timing by utilizing the thermal energy of the burned gas.

When the quantity of the air supplied from the scavenge outlet 33 is sufficient at the exhaust and scavenge strokes, that is, when the opening θTHm of the intake throttle valve 16 is large and the load is high, turbulence flow of air to be supplied is caused, and those three components are well mixed, and at the start of the combustion stroke, the three components are mixed substantially homogeneously in the combustion chamber. When the engine load is low and the quantity of the air supplied from the scavenge outlet 33 is little, the flow of air to be supplied has small turbulence.

The engine 1 is provided with the ECU 40 for controlling the actuations of the various devices such as the exhaust control valve 24, the ignition plug 8, the fuel injection valve 9, the sub-throttle valve 18 and the like. Various sensors are disposed in the engine 1, and signals detected by those sensors are inputted to the ECU 40. These sensors are exemplified, for example, by an engine rotational speed sensor 51 for detecting an engine rotational speed Ne, a throttle opening sensor 52 for detecting the opening θTHm of the intake throttle valve 16, a cooling water temperature sensor 53 for detecting a cooling water temperature Tw, a cylinder temperature sensor 54 for detecting a cylinder inner circumference temperature Tc, an intake temperature sensor 55 for detecting an intake temperature Ti, and a pressure sensor 56 for detecting the atmospheric pressure P.

On the basis of those individual input values, the ECU 40 determines, as output values respectively, a fuel injection timing tf, a fuel injection quantity F, the opening θEX of the exhaust port 21, the opening θTHs of the sub-throttle valve 18, and a spark ignition timing ts. The ECU 40 stores predetermined operation expressions using the engine rotational speed Ne and the opening θTHm of the intake throttle valve 16 as its parameters, thereby to determine individual output values tf, F, θEX, θTHs and ts from those operation expressions.

The ECU 40 outputs, on the basis of the individual output values determined from the operation expressions, actuation control signals to the fuel injection valve 9, and controls the actuations of the fuel injection valve 9 so that the fuel in a predetermined fuel injection quantity F may be injected at the predetermined fuel injection timing tf. Moreover, the ECU 40 outputs actuation control signals to the servomotor 24b, and controls the actuations of the servomotor 24b so that the valve member 24a of the exhaust control valve 24 may be slid to a predetermined sliding position thereby to adjust the exhaust port 21 to the predetermined opening θEX. Moreover, the ECU 40 outputs actuation control signals to the sub-throttle valve 18, and controls the actuations of the sub-throttle valve 18 so that the predetermined opening θTHs may be established to adjust the quantity of air supplied to the crank chamber 4a. Moreover, the ECU 40 outputs actuation control signals to the ignition plug 8, and controls the actuations of the ignition plug 8 so that the spark is ignited at the predetermined spark ignition timing ts.

Figure 2:
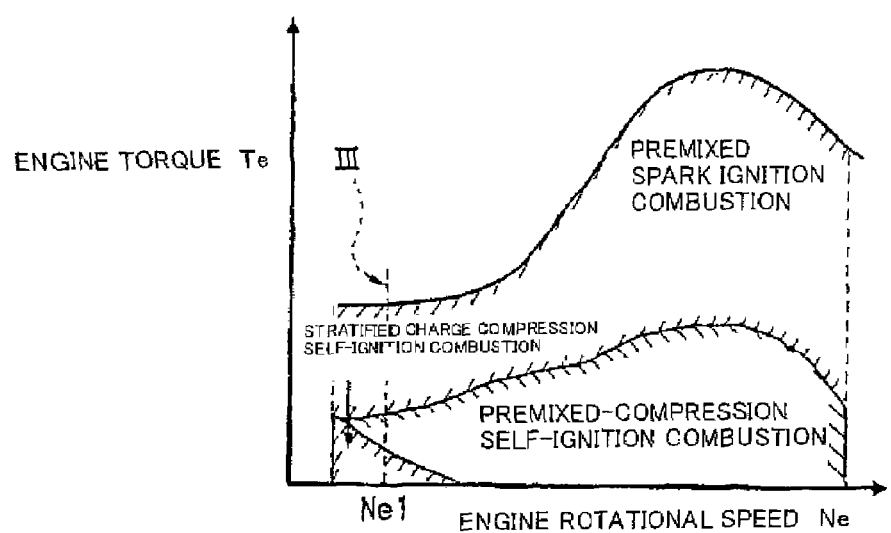
FIG. 2 is a graph showing areas of combustion modes according to a first exemplary embodiment.
Figure 3:
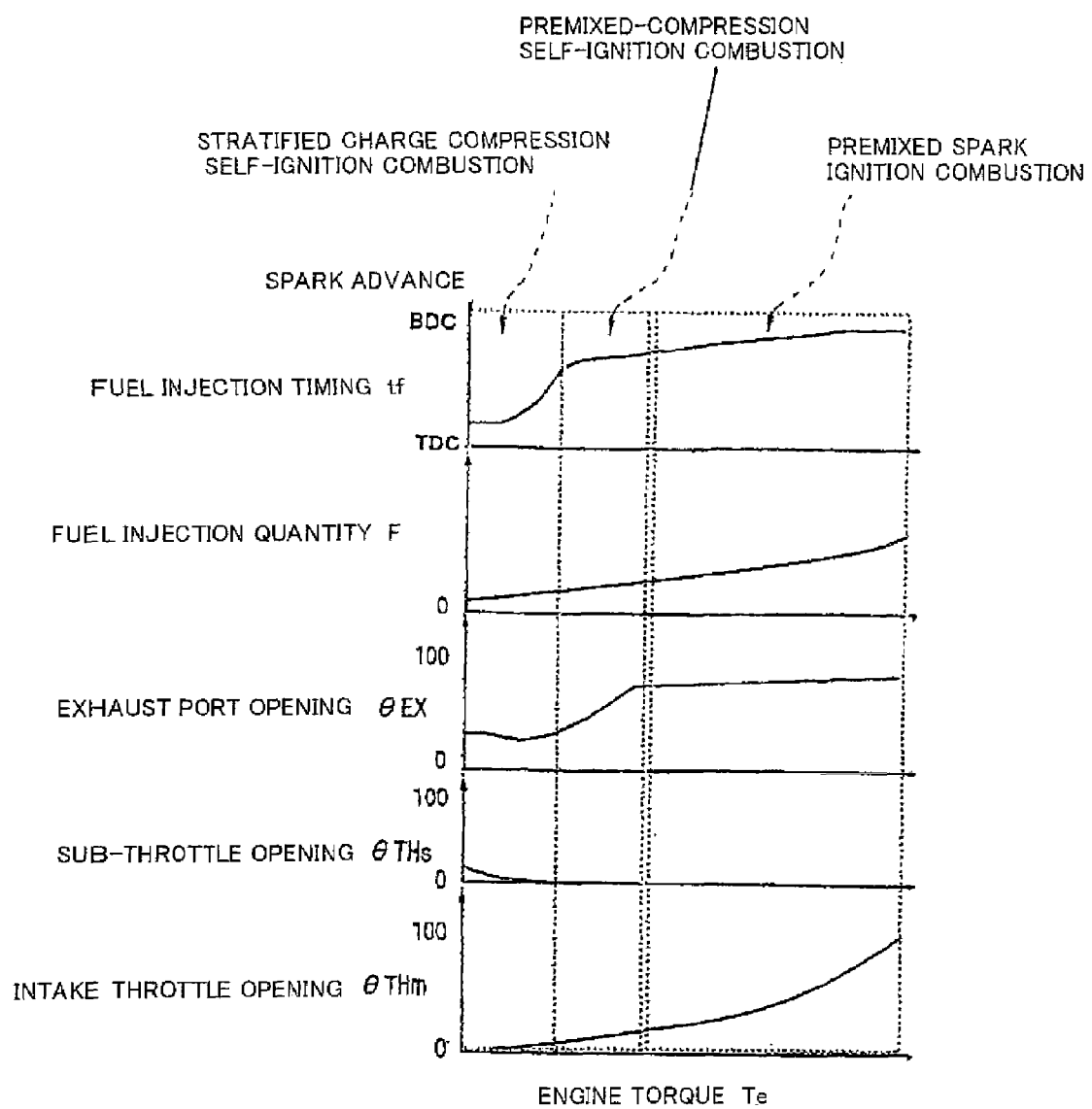
FIG. 3 is a graph showing relations between an engine torque and control states of various devices according to the first exemplary embodiment.

FIG. 2 shows the areas of the combustion modes of the engine 1 in terms of the engine rotational speed Ne and an engine torque Te. The ECU 40 is configured with such controls that: the actuation of each device is controlled according to the engine rotational speed Ne and the opening θTHm of the intake throttle valve 16 using the operation expressions; a premixed spark ignition combustion is performed in a high load range; a premixed-compression self-ignition combustion is performed in low load and medium and high rotational speed ranges; and a stratified charge compression self-ignition combustion is performed in a low load and low rotational speed range. As shown in FIG. 3, the engine torque Te is increased/decreased according to the opening θTHm of the intake throttle valve 16.

Here, the premixed spark ignition combustion means that the ignition plug 8 is activated to burn the air and the fuel with the spark ignition, the flame is propagated to the entirety of the combustion chamber 10 from the vicinity of the ignition portion 8a in which spark ignition is performed, and then the air and the fuel in the combustion chamber 10 are burned. The premixed spark ignition combustion belongs to the mode of the conventional spark ignition combustion. At this time, the three components in the combustion chamber 10 take the state, in which they are mixed substantially homogeneously. The premixed-compression self-ignition combustion means that self-ignition combustion of air and fuel is performed at the compression stroke in a state where the three components are likewise mixed substantially homogeneously in the combustion chamber 10. The premixed-compression self-ignition combustion belongs to the mode of the conventional compression self-ignition combustion.

The stratified charge compression self-ignition combustion means that the self-ignition combustion of air and fuel is performed at the compression stroke in the stratified mixture field in which the three components are substantially stratified, and that is a combustion mode characterized by the present invention. In the area for performing the stratified charge compression self-ignition combustion, it is hitherto difficult to perform the premixed-compression self-ignition combustion because the EGR ratio is high and the thermal energy necessary for the self-ignition combustion cannot be kept, thereby causing irregular combustion. In the stratified mixture field, the air and the fuel are more distributed at the central portion of the combustion chamber 10, but the burned gas is more distributed on the outer side, thereby to establish the substantially stratified state. Moreover, this stratified mixture field is established by: the proper actuation control of the exhaust control valve 24 for adjusting the opening θEX of the exhaust port; the proper actuation control of the fuel injection valve 9 capable of controlling the fuel injection timing tf and the fuel injection quantity F; the proper actuation control of the sub-throttle valve 18 capable of adjusting the quantity of the air supplied to the crank chamber 4a; and the combustion chamber 10 whose top portion 10a is offset. Those are components of stratified mixture field forming means according to the exemplary embodiment of the invention.

FIG. 3 shows the relations between the engine torque Te and the individual output values at the time when the engine rotational speed Ne is a predetermined rotational speed $Ne_1$, as indicated by broken line III in FIG. 2. At this rotational speed $Ne_1$, the three combustion modes can be taken according to the change in the engine torque Te. The actuation controls of the various devices actuated according to the load and the actuations of the various devices in the individual combustion modes are described in the following with reference to FIG. 3.

The fuel injection timing tf is set within such a area that, in the high load range for the premixed spark ignition combustion, the piston 5 is positioned near the bottom dead point in the compression stroke so that no fuel may blow off the exhaust port 21. In the low load range for the premixed-compression self-ignition combustion, too, the fuel injection timing tf is set within the area, in which the fuel does not blow off the exhaust port 21. In these two areas, moreover, the time period is sufficiently ensured to mix fuel across the entire combustion chamber 10 from after injecting till the end of the compression stroke. In the low load range for the stratified charge compression self-ignition combustion, on the other hand, the fuel injection timing tf is set to be later as the load becomes lower. And, the fuel injection quantity F is set to increase as the engine torque Te becomes higher, and is set to establish an optimum air-fuel ratio for each combustion mode.

In the low load range for the stratified charge compression self-ignition combustion, the opening θEX of the exhaust port 21 remains substantially constant irrespective of the engine torque Te, and takes a predetermined low value. In the low load range for the premixed-compression self-ignition combustion, moreover, the opening θEX becomes larger as the engine torque Te becomes higher so that the opening θEX is larger than that of the case in the area where the stratified charge compression self-ignition combustion is performed. In the high load range for the premixed spark ignition combustion, moreover, the opening θEX becomes larger as the engine torque Te gently becomes higher so that the opening θEX becomes larger than that of the case in the area where the premixed-compression self-ignition combustion is performed.

Thus, the opening θEX of the exhaust port 21 is set smaller for a lower load, and the adjustment is made to augment the EGR ratio. In this regard, since an excessive increase in the EGR ratio may make it difficult to perform self-ignition combustion due to an excessive combustion suppressing effect of the burned gas, on the low load side within the low load and low rotational speed range, the opening θEX of the exhaust port 21 is increased in order to lower the EGR ratio again. The opening θEX of the exhaust port 21 is increased by retracting the valve member 24a of the exhaust control valve 24 upward, and the exhaust stroke is effected by the exhaust port 21, which has been closed by the side face of the piston 5, being opened to the cylinder chamber 3a as the piston 5 moves downward. That is, the exhaust starting timing can be adjusted in accordance with the opening θEX of the exhaust port 21. In the area where the premixed spark ignition combustion is performed, moreover, the opening θEX is set to the optimum exhaust starting timing for the higher output, and the exhaust starting timing is set gently larger as the engine torque Te raises.

In the low load range for the stratified charge compression self-ignition combustion, the opening θTHs of the sub-throttle valve 18 is set larger as the load becomes lower. Under a lower load, therefore, the quantity of air supplied from an intake sub-passage becomes more. In the areas where the premixed-compression self-ignition combustion and the premixed spark ignition combustion are performed, the opening θTHs of the sub-throttle valve 18 is set to zero so that the air is not supplied from the intake sub-passage.

In the high load range, the opening θEX of the exhaust port 21 is set high by those actuation controls so that the pressure field in the cylinder chamber 3a has a small deviation whereas the quantity of the air supplied from the scavenge outlet 33 is much. Therefore, the scavenging efficiency is so high that the burned gas is sufficiently exhausted. At the same time, since the fuel injection timing tf is set early, the three components are sufficiently mixed in the combustion chamber 10 having a small quantity of burned gas left. When the spark ignition combustion is performed by the ignition plug 8 controlled to activate at the predetermined spark ignition timing ts, the flame propagation occurs extending over the whole of the combustion chamber 10 from the ignition portion 8a so that the crank shaft 6 can be rotated in a high output. Thus, the premixed spark ignition combustion is performed in the high load range.

Figure 8:
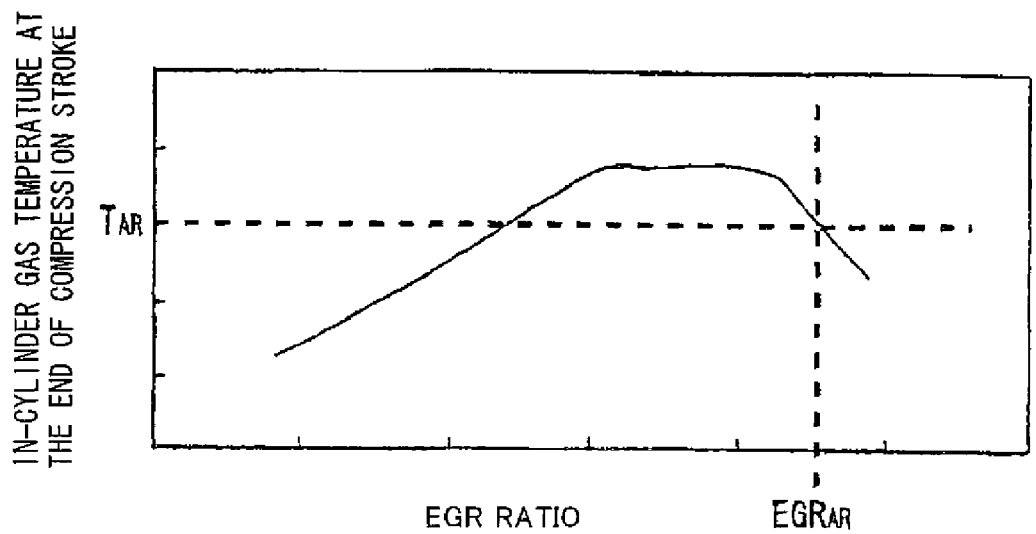
FIG. 8 is a graph showing a relation between an EGR ratio and the gas temperature in a cylinder chamber at the end of a compression stroke.

In the low load and the medium and high rotational speed ranges, the opening θEX of the exhaust port 21 is adjusted to adjust the EGR ratio, and control is performed so that the gas temperature in the cylinder chamber 3a at the end of the compression stroke exceeds a predetermined temperature $T_{AR}$, as shown in FIG. 8. At the end of the compression stroke, the self-ignition combustion of the air supplied from the scavenge outlet 33 and the fuel supplied from the fuel injection valve 9 are performed. At this time, as the load becomes lower, the quantity of air supplied into the cylinder chamber 3a from the scavenge outlet 33 becomes smaller than that of the area where the premixed spark ignition combustion is performed. However, the three components in the combustion chamber are mixed substantially homogeneously as in the premixed spark ignition combustion, by controlling the opening θEX of the exhaust port 21 and the fuel injection timing tf of the fuel injection valve 9. Thus, the premixed-compression self-ignition combustion is performed in the low load and medium and high rotational speed ranges.

In the low load and low rotational range, the quantity of air supplied into the cylinder chamber 3a from the scavenge outlet 33 becomes smaller to increase the EGR ratio, as described hereinbefore. At this time, the opening θEX of the exhaust port 21 is so set by the control of the ECU 40 as to become smaller than that in the low load and the medium and high rotational speed ranges. As a result, the exhaust pressure is raised to cause a deviation in the pressure field between the vicinity of the exhaust port 21 and the vicinity of the scavenge outlet 33. Therefore, the air supplied from the scavenge outlet 33 intrinsically has small turbulences because of its small feed, and is influenced by that deviation of the pressure field so that it forms not horizontal flow but upward spiral flow. As a result, the air supplied into the cylinder chamber 3a from the scavenge outlet 33, flows in a concentrated manner toward the central portion of the concave portion 2a formed on the inner wall of the cylinder head 2.

In this exemplary embodiment, moreover, the top portion 10a of the combustion chamber 10 is not located on the cylinder axis A but offset from the cylinder axis A to the side of the exhaust port 21. In the cylinder chamber 3a, therefore, the deviation in the pressure field becomes larger across the cylinder axis A between the side, on which the exhaust port 21 is disposed, and the opposite side thereof. As indicated by arrows in FIG. 4, therefore, the air supplied from the scavenge outlet 33 flows round about the exhaust control valve 24 so as to promote formation of vertically spiral flow, and then it flows in a concentrated manner toward the concave portion 2a formed on the inner wall of the cylinder head 2.

Thus, in the state where the air from the scavenge outlet 33 flows in a concentrated manner to the central portion of the concave portion 2a formed on the inner wall of the cylinder head 2, the fuel is injected from the nozzle portion 9a of the fuel injection valve 9 at the time when the piston 5 comes to the position near the top dead center on the basis of the actuation control signals outputted from the ECU 40. The nozzle portion 9a of the fuel injection valve 9 is protruded downward in a predetermined extent from the top portion 10a of the combustion chamber 10. As a result, the fuel is injected toward the air collected into the combustion chamber 10 from the scavenge outlet 33, as described above. With the fuel injection timing tf thus set, the compression stroke ends without sufficiently supplying fuel injected into the combustion chamber 10 to the whole of the combustion chamber 10.

Figure 9:
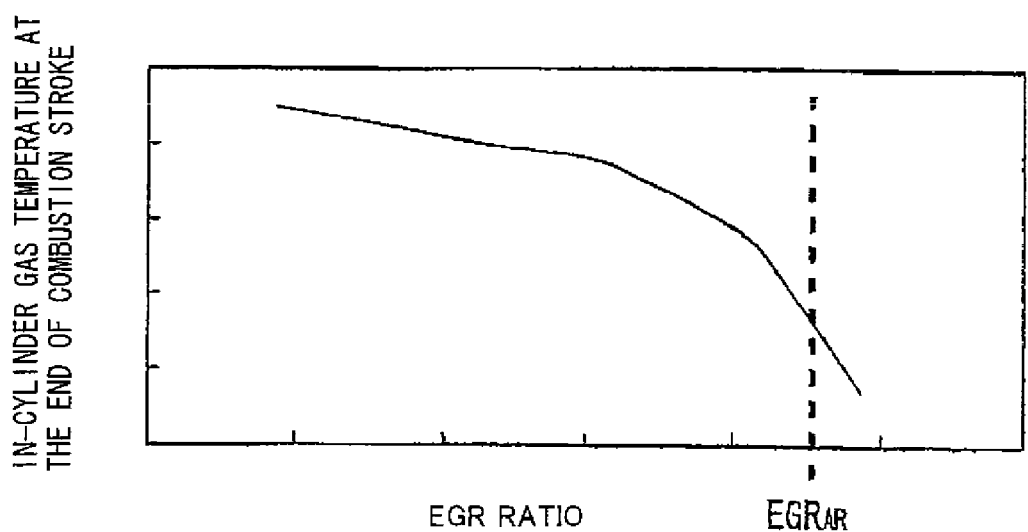
FIG. 9 is a graph showing a relation between the EGR ratio and the gas temperature in the cylinder chamber at the end of a combustion stroke.

Of the three components in the combustion chamber 10, therefore, the air and the fuel are much distributed in a central portion 10c, and the burned gas which remains without scavenging is much distributed in an outer side 10b, so that a substantially stratified mixture field is formed. At this time, in the low load and low rotational speed range, the EGR ratio exceeds a predetermined value $TGR_{AR}$ shown in FIG. 9 and the self-ignition combustion is not performed, in view of the whole of the combustion chamber 10, assuming that the three components have been homogeneously mixed in the combustion chamber 10. However, the EGR ratio is reduced at the central portion by the substantial stratifying. As a result, the combustion suppressing effect by the burned gas is ineffective, and the self-ignition combustion is performed.

In this portion where the EGR ratio is locally low and the self-ignition combustion is performed, the combustion suppressing effect is ineffective even after the combustion and the gas temperature after the end of the combustion stroke is kept high. As a result, at the next compression stroke, high thermal energy as the burned gas is retained, and the temperature of the air and fuel supplied into the cylinder chamber 3a rises to the temperature $T_{AR}$ capable of performing the self-ignition combustion. Thus, the stratified charge compression self-ignition combustion is continued in the low load and low rotational speed range.

Thus in the engine 1 of this exemplary embodiment, even in the low load and low rotational speed range where the self-ignition combustion cannot be performed in the conventional combustion mode and where the flow of the air supplied from the scavenge outlet 33 has small turbulences, the opening θEX of the exhaust port 21 is adjusted to adjust the exhaust pressure, and then the air to be supplied forms the vertically spiral flow. As a result, the air to be supplied is not sufficiently mixed in the cylinder chamber 3a but is led to the central portion of the combustion chamber 10 so that the stratifying is promoted. As a result, the states of low EGR ratios are locally formed in the combustion chamber 10 so that the self-ignition combustion can be continuously performed even in the load range where the combustion cannot be sustained in the substantially homogeneously mixed state of the conventional art. As a result, the irregular combustion can be eliminated to provide a 2-cycle engine with improved fuel consumption.

Moreover, the top portion 10a of the combustion chamber 10 is offset to the exhaust port 21 with respect to the cylinder axis A. As a result, a high deviation can be formed in the pressure field with respect to the cylinder axis A between the side, on which the exhaust port 21 is formed, and the opposite side thereof, so that the formation of the vertically spiral flow can be promoted. As a result, the air supplied from the scavenge outlet 33 flows in a concentrated manner toward the combustion chamber 10 thereby to form the stratified mixture field more reliably.

Moreover, the fuel is directly injected into the cylinder chamber 3a by the fuel injection valve 9. As a result, the fuel can be injected at the optimum fuel injection timing tf and in the optimum fuel injection quantity F so that the self-ignition combustion can be performed in the optimum state. In the low load and low rotational speed range, the fuel injection timing tf occurs just before the end of the compression stroke but later than the remaining areas. As a result, the stratified mixture field can be formed more reliably without supplying the injected fuel to the whole of the combustion chamber 10.

When the load goes down in the low load and low rotational speed range, the opening θTHs of the sub-throttle valve 18 is accordingly enlarged to supply the air from the intake sub-passage. As a result, the quantity of the air supplied from the scavenge outlet 33 into the cylinder chamber 3a can be stabilized to stably control the flow of the air supplied from the scavenge outlet 33. It is thus possible to form the stratified fixture field continuously and stably and to stabilize the stratified charge compression combustion.

However, even in the case where the stratified charge compression combustion is performed in this way, when the temperature of the engine E or the temperature of the residual gas in the combustion chamber 10 is low, such as at the time of starting the engine E or idling, it may become impossible for the supply air and the supply fuel to obtain the thermal energy necessary for self-ignition combustion from the residual gas. As an example of an engine capable of reliably eliminating irregular combustion even in such a situation, description will now be given of a second exemplary embodiment of the 2-cycle engine according to the present invention with reference to FIGS. 6, 7. According to this exemplary embodiment, the contents of control by the ECU 40 are changed as compared with those of the first exemplary embodiment, and the construction of the engine E and the electrical connections relating to the ECU 40 are identical to those of the first exemplary embodiment shown in FIG. 1. The ignition plug 8 is preferably mounted to the cylinder head 2 with the ignition portion 8a being located at the central portion 10c of the combustion chamber 10.

Figure 6:
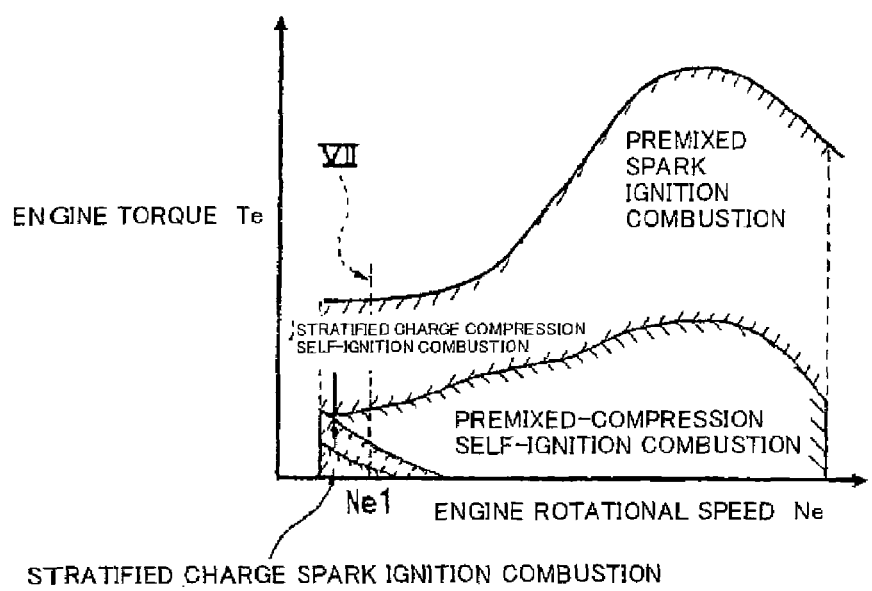
FIG. 6 is a graph showing areas of combustion modes according to a second exemplary embodiment.

In this exemplary embodiment, as shown in FIG. 6, in a low load as well as low rotational speed range within the low load and low rotational speed range in which the stratified charge compression self-ignition combustion is performed (referred to as the extremely low load and low rotational speed range), stratified charge spark ignition combustion is performed instead of the stratified charge compression self-ignition combustion. In the stratified charge spark ignition combustion, in a state where a stratified mixture field is formed within the combustion chamber 10, spark ignition combustion of a mixture composed of air and fuel is performed using the ignition plug 8. In other areas, as in the first exemplary embodiment, premixed spark ignition combustion, premixed-compression self-ignition combustion and stratified charge compression self-ignition combustion are performed.

Figure 7:
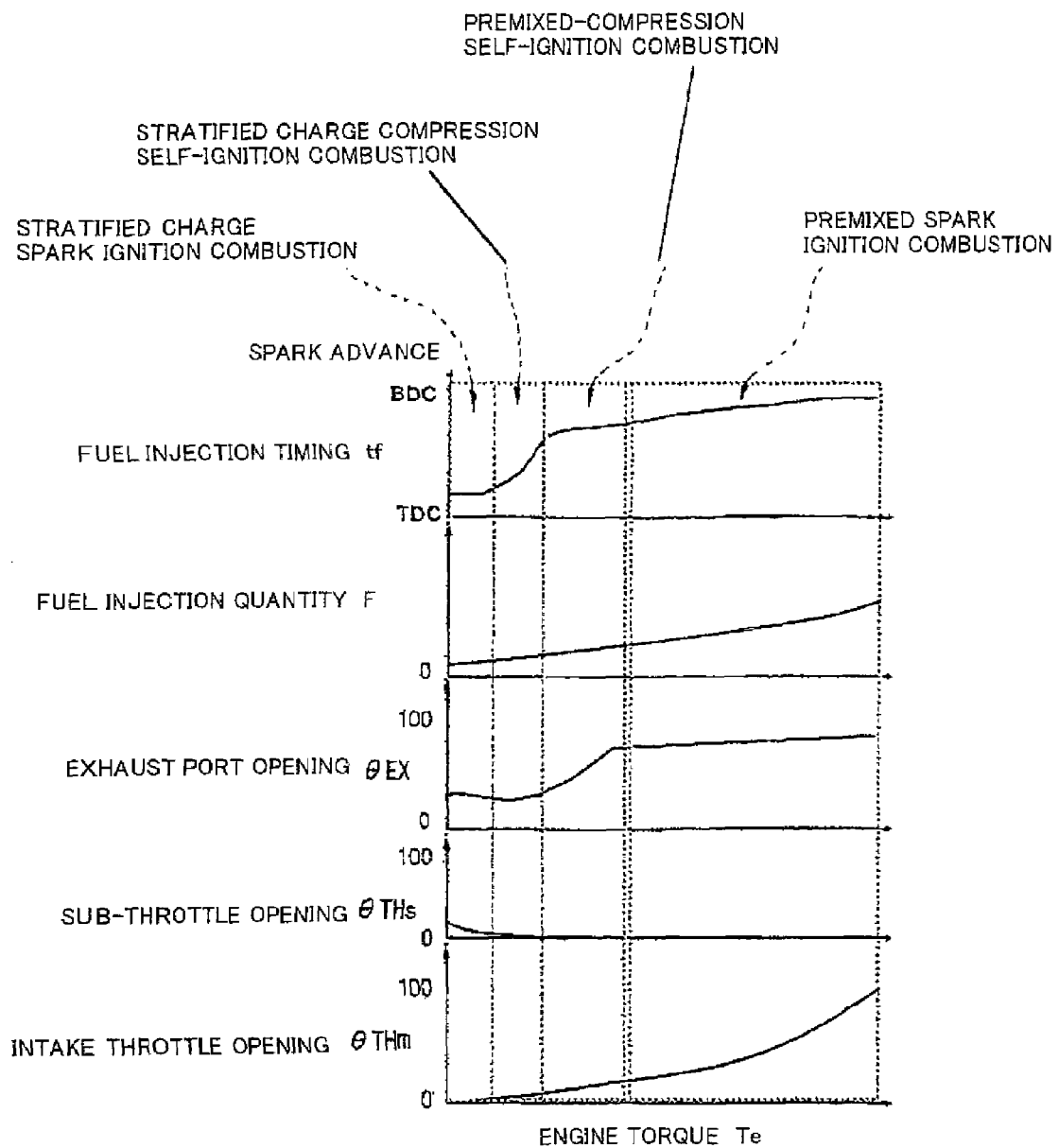
FIG. 7 is a graph showing relations between an engine torque and control states of various devices according to the second exemplary embodiment.

FIG. 7 shows the relations between the engine torque Te and the individual output values at a predetermined rotational speed $Ne_1$ indicated by broken line VII in FIG. 6. In the extreme low load and low rotational speed range, as compared with other areas, the fuel injection timing tf is set to be later so that supply fuel does not spread across the entire combustion chamber 10, and the fuel injection quantity F is set small so as to establish an optimum air-fuel ratio; since the opening θTHm of the intake throttle valve 16 is substantially zero, to replenish and adjust the quantity of air, the opening θTHs of the sub-throttle valve 18 is set to become larger as the load becomes lower, and since an excessive increase in the EGR ratio results in a large combustion suppressing effect of the burned gas, the opening of the exhaust port θEX is set to become larger as the load becomes lower.

Since the individual output values are set in this way in the extremely low load and low rotational speed range through the activation control as described above, a stratified mixture field is formed in the interior of the combustion chamber 10 as in the first exemplary embodiment. Then, spark ignition combustion of the mixture collected to the central portion 10c is performed by means of the ignition plug 8 controlled so as to activate at the predetermined spark ignition timing ts. Because the ignition portion 8a of the ignition plug 8 is located at the central portion 10c, the mixture collected to the central portion 10c can be readily ignited.

In this exemplary embodiment, in the extremely low load and low rotational speed range where the temperature of the residual gas is low and thus it may be impossible to obtain the thermal energy required for self-ignition combustion, spark ignition combustion is performed after forming a stratified mixture field. This makes it possible to more reliably eliminate irregular combustion, which may occur in areas for performing the stratified charge compression self-ignition combustion.

Since four combustion modes are taken according to the engine rotational speed and the engine load, the optimum combustion mode is finely selected and set within the range from the extremely low load and low rotation speed range up to the high load range, thereby achieving an improvement in fuel consumption or drivability. Although the appropriate supply air quantity or EGR ratio at this time differs between the combustion modes, the fine setting of the combustion mode means that it is not necessary to change the supply air quantity or the ERG ratio extremely upon transition of the combustion mode, whereby the actuation controls of various devices can be shifted smoothly in accordance with the combustion mode to thereby achieve an improvement in drivability or the like.

The exemplary embodiments of the 2-cycle engine according to the invention have been described hereinbefore. However, the embodiments should not be necessarily limited to the constitution but can be suitably modified. In the above embodiments, for example, the combustion chamber 10 is formed by offsetting the top portion 10a to the exhaust port 21. Even if, however, the combustion chamber 10 is formed by offsetting it toward the opposite side of the exhaust port 21, the 2-cycle engine can similarly act with similar effects. Moreover, the ECU 40 may also be configured with such control that the individual output values determined from operation expressions using the engine load conditions as the input parameters as described above, are corrected according to the engine temperature conditions or the environmental conditions of the intake air. If the engine temperature is low, for example, there arises a problem that the loss of the thermal energy rises to make it hard to keep the temperature of the burned gas high.

In order to address this problem, the ECU 40 may also be configured with such controls that: the opening θEX of the exhaust port 21 determined from the operation expressions is corrected on the basis of the input values such as the cooling water temperature Tw, the cylinder inner circumference temperature Tc and so on; the servomotor is actuated on the basis of the corrected value; and the opening θEX of the exhaust port 21 is adjusted so that the engine temperature may become higher. By thus executing the correction control incorporating the engine temperature conditions, the self-ignition combustion can be ensured in a more proper state. The configuration for setting the combustion mode in accordance with the engine temperature condition in this way proves particularly effective in the case of the second exemplary embodiment. That is, when the engine temperature is low, since it is difficult to perform self-ignition combustion, it is preferable to adopt a setting in which the individual output values are corrected so as to enlarge the area for performing the stratified charge spark ignition combustion to the high load side and also to enlarge the area for performing the stratified compression self-ignition combustion to the high load side. As a result, irregular combustion in the low load and low rotational speed range can be eliminated with greater reliability.

Here, the relations, as shown in FIG. 3, between the engine torque Te and the individual output values are presented as charts corresponding to the predetermined engine rotational speed $Ne_1$. If, therefore, the value of the engine rotational speed Ne inputted to the operation expressions stored in the ECU 40 varies, the individual output values determined by the operation expressions vary to change the tendencies of the charts so that the control states of the various devices change. Moreover, the operation expressions for determining the individual output values can be suitably modified according to the output characteristics of the engine. The individual output values to be determined are varied to change the tendencies of the charts suitably, even if the charts show the relations between the engine torque Te corresponding to the same predetermined engine rotational speed $Ne_1$ and the individual output values.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

This application is based on Japanese Patent Application Nos. 2005-261769, filed on Sep. 9, 2005, and 2006-167360, filed on Jun. 16, 2006, the entire contents of which are hereby incorporated by reference.

INDUSTRIAL APPLICABILITY

The present invention is applicable to a 2-cycle engine, which includes an exhaust control valve capable of adjusting the opening of an exhaust port so as to perform self-ignition combustion of supply air and supply fuel in a combustion chamber with operation of the exhaust control valve.

What is claimed is:

1. A 2-cycle engine comprising:
   a cylinder including a cylinder chamber, wherein a piston is accommodated in the cylinder chamber;
   an ignition device directed so that an ignition portion is positioned in a central portion in a combustion chamber defined by the piston and an inner circumference of the cylinder chamber;
   an exhaust control valve that adjusts an opening of an exhaust passage connected to an exhaust port opened on an inner circumference of the cylinder chamber;
   a controller that controls actuations of the ignition device and the exhaust control valve, wherein the controller controls: the ignition device to activate to perform a spark ignition combustion of a mixture including air and fuel supplied into the cylinder chamber in a high load range; and the exhaust control valve to adjust the opening of the exhaust port so as to control pressure in the cylinder chamber to perform self-ignition combustion of the mixture in the combustion chamber;

stratified mixture field forming means for forming a stratified mixture field where: the mixture is much distributed at a central portion of the combustion chamber; and burned gas remaining in the combustion chamber is much distributed on an outer side of the central portion of the combustion chamber, in a low load and low rotational speed range that is a low rotational speed range within the low load range; and a direct injection device that directly injects and supplies the supply fuel into the cylinder chamber, wherein the controller controls the stratified mixture field forming means to form the stratified mixture field to perform the self-ignition combustion of the mixture, in the low load and low rotational speed range, and wherein the controller controls the ignition device to perform a spark ignition combustion of a mixture forming the stratified mixture field in an extremely low load and low rotational speed range, which is a low load as well as low rotational speed range within the low load and low rotational speed range.

2. The 2-cycle engine according to claim 1, wherein the stratified mixture field forming means includes the exhaust control valve, the controller controls the exhaust control valve:
so that the opening of the exhaust port becomes smaller, in the low load and low rotational speed range;
so that the opening of the exhaust port becomes larger than that of the case in the low load and the low rotational speed range and the opening of the exhaust port rises as the load rises, in a low load and medium rotational speed range, which is a medium rotational speed range within the low load range; and
so that the opening of the exhaust port becomes larger than that of the case in the low load and medium rotational speed range and the opening of the exhaust port rises as the load rises, in a high load range.

3. The 2-cycle engine according to claim 1, wherein the stratified mixture field forming means includes the combustion chamber whose top part is offset to the exhaust port or to an opposite side thereof with respect to a cylinder axis of the cylinder chamber.

4. The 2-cycle engine according to claim 1, wherein the stratified mixture field forming means includes a direct injection device that directly injects and supplies the supply fuel into the cylinder chamber, and the controller controls the direct injection device to activate so that a timing for supplying the supply fuel into the cylinder chamber is delayed compared with the cases in the low load and medium rotational speed range and the high load range, in the low load and low rotational speed range.

5. A 2-cycle engine comprising:

a cylinder including a cylinder chamber, wherein a piston is accommodated in the cylinder chamber;

an ignition device including an ignition portion directed into a combustion chamber defined by the piston and an inner circumference of the cylinder chamber;

an exhaust control valve that adjusts an opening of an exhaust passage connected to an exhaust port opened on an inner circumference of the cylinder chamber;

a controller that controls actuations of the ignition device and the exhaust control valve , wherein the controller controls: the ignition device to activate to perform a spark ignition combustion of a mixture including air and fuel supplied into the cylinder chamber in a high load range; and the exhaust control valve to adjust the opening of the exhaust port so as to control pressure in the cylinder chamber to perform self-ignition combustion of the mixture in the combustion chamber; and stratified mixture field forming means for forming a stratified mixture field where: the mixture is much distributed at a central portion of the combustion chamber; and burned gas remaining in the combustion chamber is much distributed on an outer side of the central portion of the combustion chamber, in a low load and low rotational speed range that is a low rotational speed range within the low load range, wherein the stratified mixture field forming means includes a sub-throttle valve that adjusts a quantity of the air supplied into the combustion chamber in accordance with an opening of the sub-throttle valve, and the controller controls the sub-throttle valve to activate so that the opening of the sub-throttle valve becomes larger as reduction of the load to increase the quantity of the supply air and the self-ignition combustion of the mixture is performed by forming the stratified mixture field, in the low load and low rotational speed range.

6. The 2-cycle engine according to claim 1, further comprising:

a load detecting device that detects a load; and a temperature detecting device that detects an engine temperature, wherein the controller executes such control that a timing when the fuel is supplied into the combustion engine, the quantity of the supply fuel, and the opening of the exhaust port are adjusted on the basis of the load detected by the load detecting device and the engine temperature detected by the temperature detecting device.

7. The 2-cycle engine according to claim 2, wherein the stratified mixture field forming means includes the combustion chamber whose top part is offset to the exhaust port or to an opposite side thereof with respect to a cylinder axis of the cylinder chamber.

8. The 2-cycle engine according to claim 2, wherein the stratified mixture field forming means includes a direct injection device that directly injects and supplies the supply fuel into the cylinder chamber, and the controller controls the direct injection device to activate so that a timing for supplying the supply fuel into the cylinder chamber is delayed compared with the cases in the low load and medium rotational speed range and the high load range, in the low load and low rotational speed range.

9. The 2-cycle engine according to claim 3, wherein the stratified mixture field forming means includes a direct injection device that directly injects and supplies the supply fuel into the cylinder chamber, and the controller controls the direct injection device to activate so that a timing for supplying the supply fuel into the cylinder chamber is delayed compared with the cases in the low load and medium rotational speed range and the high load range, in the low load and low rotational speed range.

10. The 2-cycle engine according to claim 2, wherein the stratified mixture field forming means includes a sub-throttle valve that adjusts a quantity of the air supplied into the combustion chamber in accordance with an opening of the sub-throttle valve, and the controller controls the sub-throttle valve to activate so that the opening of the sub-throttle valve becomes larger as reduction of the load to increase the quantity of the supply air, in the low load and low rotational speed range.

11. The 2-cycle engine according to claim 3, wherein the stratified mixture field forming means includes a sub-throttle valve that adjusts a quantity of the air supplied into the combustion chamber in accordance with an opening of the sub-throttle valve, and the controller controls the sub-throttle valve to activate so that the opening of the sub-throttle valve becomes larger as reduction of the load to increase the quantity of the supply air, in the low load and low rotational speed range.

12. The 2-cycle engine according to claim 4, wherein the stratified mixture field forming means includes a sub-throttle valve that adjusts a quantity of the air supplied into the combustion chamber in accordance with an opening of the sub-throttle valve, and the controller controls the sub-throttle valve to activate so that the opening of the sub-throttle valve becomes larger as reduction of the load to increase the quantity of the supply air, in the low load and low rotational speed range.

13. The 2-cycle engine according to claim 2, further comprising:

a load detecting device that detects a load; and a temperature detecting device that detects an engine temperature, wherein the controller executes such control that a timing when the fuel is supplied into the combustion engine, the quantity of the supply fuel, and the opening of the exhaust port are adjusted on the basis of the load detected by the load detecting device and the engine temperature detected by the temperature detecting device.

14. The 2-cycle engine according to claim 3, further comprising:

a load detecting device that detects a load; and a temperature detecting device that detects an engine temperature, wherein the controller executes such control that a timing when the fuel is supplied into the combustion engine, the quantity of the supply fuel, and the opening of the exhaust port are adjusted on the basis of the load detected by the load detecting device and the engine temperature detected by the temperature detecting device.

15. The 2-cycle engine according to claim 4, further comprising:

a load detecting device that detects a load; and a temperature detecting device that detects an engine temperature, wherein the controller executes such control that a timing when the fuel is supplied into the combustion engine, the quantity of the supply fuel, and the opening of the exhaust port are adjusted on the basis of the load detected by the load detecting device and the engine temperature detected by the temperature detecting device.

16. The 2-cycle engine according to claim 5, further comprising:

a load detecting device that detects a load; and a temperature detecting device that detects an engine temperature, wherein the controller executes such control that a timing when the fuel is supplied into the combustion engine, the quantity of the supply fuel, and the opening of the exhaust port are adjusted on the basis of the load detected by the load detecting device and the engine temperature detected by the temperature detecting device.

* * * * *

UNITED STATES PATENT AND TRADEMARK OFFICE
CERTIFICATE OF CORRECTION

PATENT NO. : 7,685,989 B2  Page 1 of 1
APPLICATION NO. : 12/065866
DATED : March 30, 2010
INVENTOR(S) : Kenji Nishida It is certified that error appears in the above-identified patent and that said Letters Patent is hereby corrected as shown below:

On the Title Page, At Item (30) Foreign Application Priority Data, change:

"June 16, 2005   (JP) .................2006-167360" to

--June 16, 2006   (JP) .................2006-167360--

Signed and Sealed this

Twentieth Day of July, 2010

David J. Kappos
*Director of the United States Patent and Trademark Office*